June 3, 1952   H. G. HOLMES   2,598,794
LEVELING MECHANISM FOR HEADLIGHT TESTERS
Filed April 22, 1946   4 Sheets-Sheet 2

HERBERT GLENN HOLMES.

By Philip G. Minnis.

Attorney

June 3, 1952     H. G. HOLMES     2,598,794
LEVELING MECHANISM FOR HEADLIGHT TESTERS.
Filed April 22, 1946     4 Sheets-Sheet 3

Inventor
HERBERT GLENN HOLMES.
By Philip A. Minnis.
Attorney

June 3, 1952     H. G. HOLMES     2,598,794
LEVELING MECHANISM FOR HEADLIGHT TESTERS
Filed April 22, 1946     4 Sheets-Sheet 4
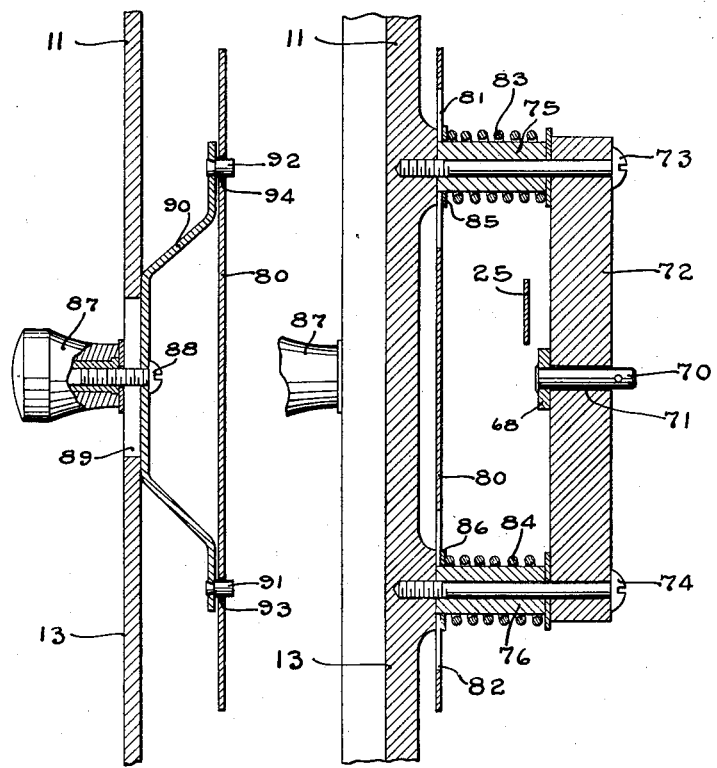
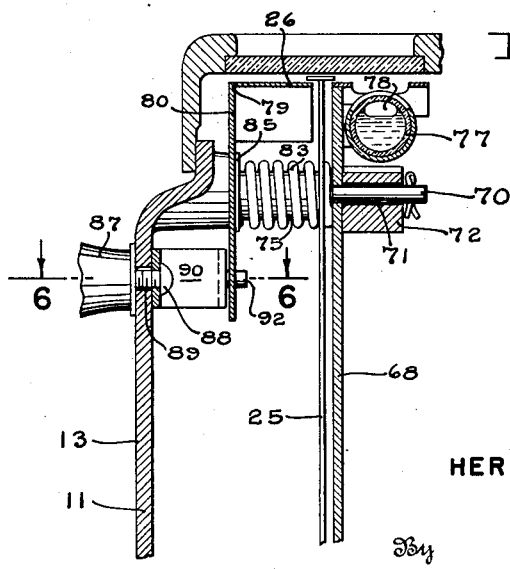
Inventor
HERBERT GLENN HOLMES.
By Philip A. Minnis
Attorney Patented June 3, 1952

2,598,794

UNITED STATES PATENT OFFICE 2,598,794

LEVELING MECHANISM FOR HEADLIGHT TESTERS

Herbert Glenn Holmes, Lansing, Mich., assignor to Food Machinery and Chemical Corporation, San Jose, Calif., a corporation of Delaware Original application June 18, 1940, Serial No. 341,178. Divided and this application April 22, 1946, Serial No. 663,909

10 Claims. (Cl. 33—180)

This invention relates to leveling mechanism for apparatus used for testing the angle of inclination of the light beam projected by an automobile headlight.

This application is a division of my co-pending application Serial No. 341,178, filed June 18, 1940, for a Headlight Tester which issued December 3, 1946, as Patent No. 2,411,879.

One object of the present invention is to provide improved leveling mechanism for determining the angle of inclination of the axis of a headlight testing instrument when the axis is aligned with the headlight beam.

Another object is to provide a simple manually adjustable leveling mechanism for use with headlight testing instruments to determine the vertical inclination of the headlight beam.

Another object is to provide mechanism for adjusting the spirit level of the leveling mechanism of a headlight testing instrument to correct the zero position of the level when the automobile is not standing on a true horizontal surface at the time the headlights are being tested.

A further object is to provide mechanism for adjusting the level of headlight testing instruments, which is simple in construction and accurate in operation.

Other and further objects and advantages of the invention will become more apparent from the following description, taken in connection with the accompanying drawings, in which:

Fig. 4 is a fragmentary vertical section taken along line 4—4 of Fig. 2.

Fig. 5 is a fragmentary horizontal section taken along line 5—5 of Fig. 2.

Fig. 6 is a fragmentary horizontal section taken along line 6—6 of Fig. 4.

In order to facilitate an understanding of the invention, a preliminary explanation will be given in which the general arrangement and use of the headlight testing instrument will be briefly set forth.

Figure 1:
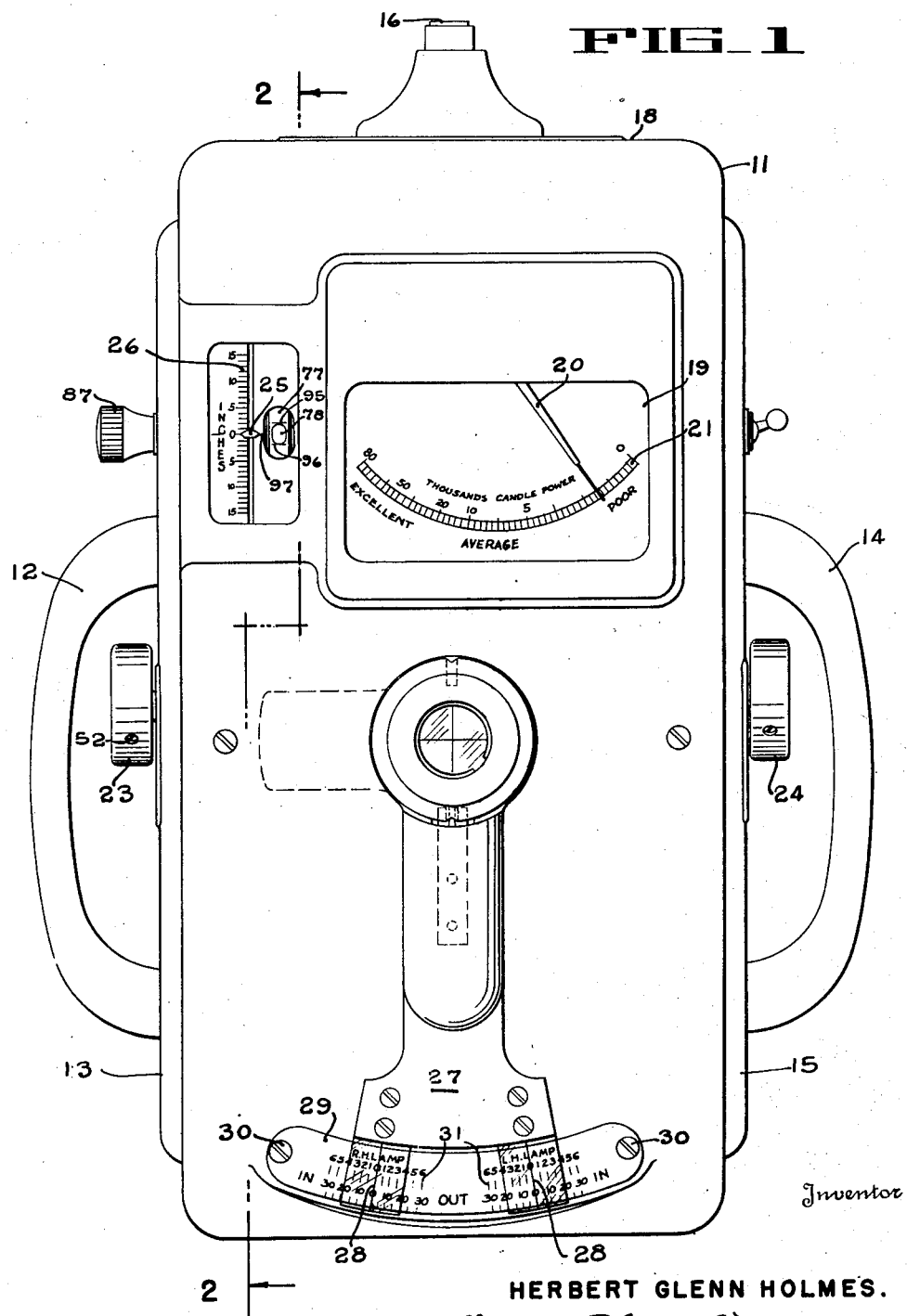
Fig. 1 is a plan view of a headlight testing instrument provided with the leveling mechanism of the present invention.

The headlight testing instrument comprises a case 11 (Fig. 1), provided with a handle 12 mounted on the left side 13 and a handle 14 mounted on the right side 15 thereof. When used as a portable instrument the operator holds the instrument in his hands by means of the handles 12, 14 and places the same in the beam of the headlight to be tested by pressing the contact 16, which is preferably made of rubber, against the lens of the headlight.

Figure 3:
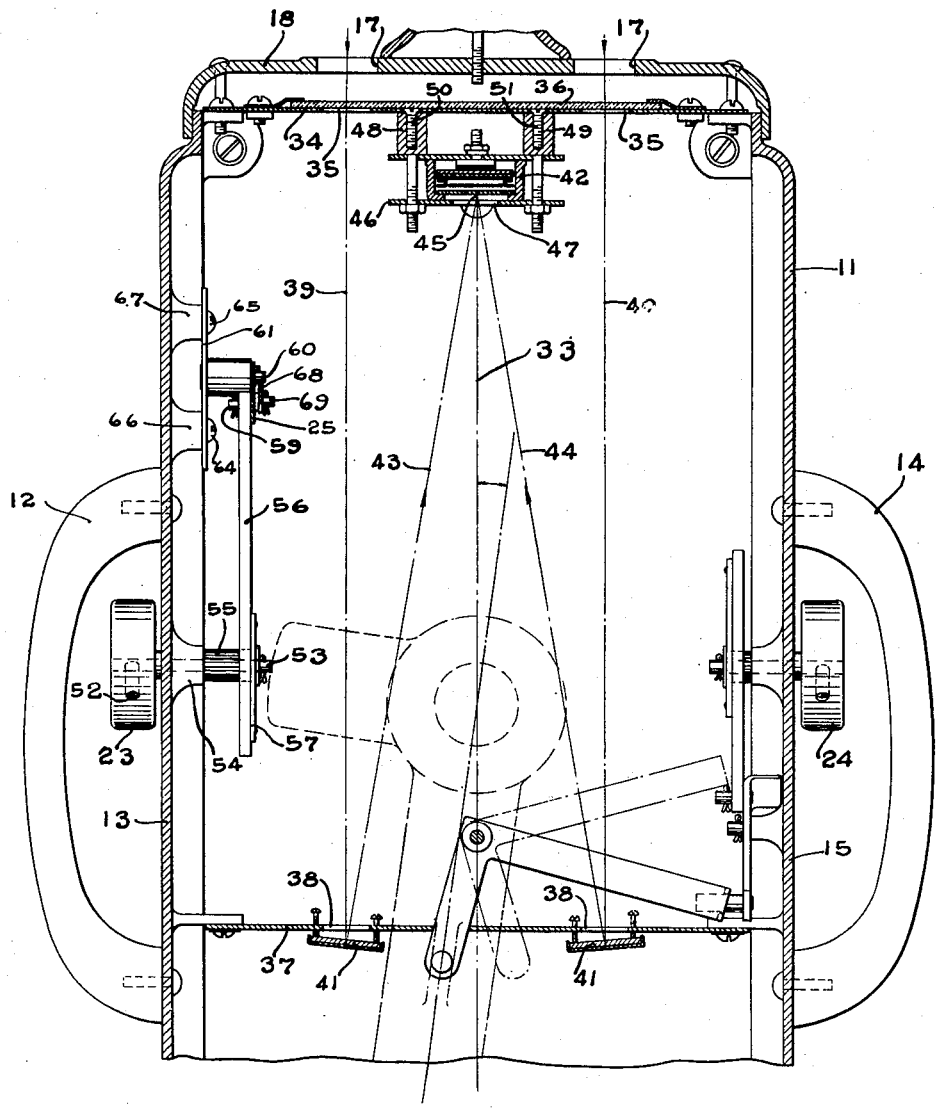
Fig. 3 is a horizontal section through the instrument, showing the level adjusting mechanism.

Rays from the beam of the headlight are admitted to the interior of the instrument through a plurality of orifices 17 (Fig. 3) located about the contact 16 in the front wall 18 of the case 11.

The intensity of the light admitted to the instrument from the beam is registered on a meter 19 (Fig. 1) which is provided with a pointer 20 that moves over a scale 21 calibrated in candle power.

Holding the contact 16 against the lens of the headlight the operator manipulates the instrument with a universal movement, that is, left and right, and up and down, until he finds the position of the instrument at which the maximum reading is obtained on the intensity meter 19. The longitudinal axis of the instrument which passes through the center of the contact 16 is then substantially in coincidence with the axis of the beam and in parallelism with the rays thereof. In order to determine the direction of the beam, the operator turns the knob 23 with his left thumb to measure the vertical inclination, and he turns the knob 24 with his right thumb to measure the horizontal inclination. When the knob 23 has been properly adjusted, as will presently be described, the operator reads the vertical inclination by means of the pointer 25 on scale 26, and when the knob 24 has been properly adjusted, he reads the horizontal inclination by means of the pointer 27, which has two cross hairs 28 that cooperate with two sets of scales, one for the right hand lamp, the other for the left hand lamp. These scales are marked on an arcuate strip 29 which is attached by means of screws 30 to the top of the case 11. The upper scales 31 are calibrated in inches at twenty-five feet distance and the lower scales are calibrated in degrees, so that the horizontal inclination may be measured either in angular degrees or in inches.

Rigidly mounted within the case 11 and accurately positioned normal to the axis 33 is a diaphragm 34. The diaphragm 34 (Fig. 3) has a series of apertures 35 which are located in longitudinal alignment with the apertures 17 (Fig. 3), and are smaller than the apertures 17. A transparent glass plate 36 is mounted on the front of the diaphragm 34 and covers the apertures therein. A second diaphragm 37 is rigidly mounted in the rear end of the case 11 so as to be accurately positioned normal to the longitudinal axis 33. The diaphragm 37 (Fig. 3) has a series of apertures 38 which are the same size as the apertures in the front diaphragm 34 and are located in longitudinal alignment therewith. The purpose of the aligned apertures in the two diaphragms 34 and 37 is to select parallel rays from the beam of the headlight.

When the instrument axis 33 is positioned substantially coincident with the axis of the headlight beam and parallel to the rays thereof, parallel rays such as 39 and 40 (Fig. 3) will enter the apertures 17 in the front wall 18 of the case, pass through the apertures 35 in the front diaphragm 34 and then pass through the apertures 38 in the rear diaphragm 37. It will be apparent that this only occurs when the instrument is positioned so that its axis 33 is parallel to the rays 39, 40, because if the instrument axis 33 is out of parallelism with the rays of the beam, other rays, although they might enter the apertures 17, would not pass through the apertures 38.

A series of planar mirrors 41 (Fig. 3) is mounted on the rear side of the rear diaphragm 37 with the mirrors behind the apertures 38, and so positioned that they will reflect the rays into a light-sensitive cell 42, as indicated by lines 43, 44 which converge at 45. This may be called the "hot spot" of the beam or point of greatest intensity which coincides with the major axis of the beam. A shield 46 having an aperture 47 is placed over the window of the light-sensitive cell 42. The shield 46 serves to exclude from the light-sensitive cell all rays reflected thereon except rays such as 39 and 40 which enter the instrument parallel to its axis 33. It will be noted that the focal point 45 of the reflected rays lies on the instrument axis 33, so that rays from the beam, such as 39 and 40, are not reflected onto the light-sensitive cell 42 until the instrument axis 33 is brought into parallelism with the rays of the beam.

The light-sensitive cell 42 is rigidly mounted on the front diaphragm 34 by means of two bosses 48, 49 (Fig. 3) into which screws 50, 51 are threaded. The light-sensitive cell 42 is of the blocking-layer type, the metallic elements of which create an electromotive force when exposed to light. The electrical response of the cell is measured by a sensitive meter 19, electrically connected to the cell 42 in the manner fully described in my co-pending application Serial No. 341,178, which application resulted in the issuance of Patent No. 2,411,879 dated December 3, 1946.

When the instrument axis 33 (Fig. 3) is brought into line with the beam, parallel rays pass through the apertures in the two diaphragms 34, 37 and are reflected by the mirrors 41 through the aperture 47 onto the light-sensitive cell 42, and the meter 19 (Fig. 1) registers the intensity of the light. Conversely, when a maximum reading is obtained on the meter 19, it is an indication that the instrument or reference axis 33 has been positioned in line with the beam and the direction of the beam is, in this way, determined.

The mechanism by which the vertical angle of inclination of the beam to the line of travel of the vehicle is measured will now be described.

The vertical inclination is determined by means of a gravity-responsive leveling device which is adjusted by means of the knob 23 (Fig. 1) disposed within the handle 12. The knob 23 is secured by means of a set screw 52 to the outer end of a shaft 53 (Fig. 3) which is mounted for rotation in a boss 54 formed on the side wall 13 of the case. A pinion 55 is secured on the shaft 53 for rotation by the knob 23. A rack 56 (Fig. 2) meshes with the pinion 55. A guide plate 57 is rigidly attached to the rack 56 and has a slot 58 therein through which the shaft 53 passes so that the rack 56 is guided for sliding movement with respect to the shaft 53 and is maintained in mesh with the pinion 55. The forward end of the rack 56 is pivotally connected at 59 to the pointer 25. The foot of the pointer 25 is pivotally supported at 60 on a bar 61 which is provided with two slots 62, 63 to receive screws 64, 65 which are threaded into bosses 66, 67 (Fig. 3) formed on the side wall 13 of the case. By loosening the screws 64, 65 the bar 61 may be moved forwardly or rearwardly to position the pivotal center 60 of the pointer 25. This adjustment is usually made at the factory for a purpose presently to be described. A lever 68 (Fig. 2) is connected by pin and slot connection 69 to the pointer 25. The lever 68 is rotatably mounted by means of a pin 70 (Figs. 2 and 5) secured thereto and having bearing in an aperture 71 in a member 72 which is rigidly mounted on the side wall 13 by means of screws 73, 74 which extend through spacing sleeves 75, 76. It will be understood that the member 72 is fixed, but the pin 70 is free to rotate in the aperture 71, thus providing a fulcrum for the lever 68. The upper end of the lever 68 (Figs. 2 and 4) has a spirit level 77 rigidly secured thereto.

By means of the linkage construction just described, the rack 56 (Fig. 2) oscillates the pointer 25 and through pin and slot connection 69 the lever 68 is free to pivot at 70 thereby rocking the spirit level 77 responsive to the movement of the pointer 25. The construction of the linkage is such that while the movement of the pointer is proportional to the movement of the spirit level, the movement of the pointer is greatly multiplied to facilitate obtaining a reading on the scale 26. Also, the movements are in opposite directions; that is, when the rack 56 moves the pointer 25 to the left in Fig. 2, the level 77 is rocked to the right. This further facilitates making the adjustment in that the pointer moves in the same direction as the bubble 78 of the level 77.

The scale 26 (Fig. 2) is arcuate in shape and is secured at its outer edge 79 (Fig. 4) to a vertical plate 80 having slots 81, 82 (Fig. 5) through which the spacing sleeves 75, 76 extend. Springs 83, 84 coiled about the sleeves 75, 76 bear against washers 85, 86 to apply friction to the plate 80 to hold the plate 80 in its adjusted position on the sleeves 75, 76. It will be understood that the plate 80 is supported by means of these sleeves but is slidably adjustable thereon by reason of the slots 81, 82. In order to impart sliding adjustment to the scale plate 80 (Fig. 6) a knob 87 is provided outside the side wall 13. A screw 88, which is slidable in a slot 89 (Fig. 6), formed in the wall 13 is threaded into the knob 87. The screw 88 passes through a member 90 which has pins 91, 92 engaging in apertures 93, 94 in the scale plate 80. In order to adjust the scale 26 the operator unscrews the knob 87 from the screw 88 a sufficient amount to permit movement of the knob back and forth, thus causing the scale plate 80 to slide on the sleeves 75, 76. When the scale 26 has been positioned as desired, the knob 87 is tightened to hold the adjustment. This scale adjustment is employed by the operator to correct the zero position when the automobile is not standing on a true horizontal surface at the time the headlights are being tested.

The operator makes the corrective adjustment by placing the instrument on a part of the car which is known to be level, such as the running board or the floor of the trunk compartment, and leveling the spirit level 77 (Fig. 1) by turning the knob 23. When the bubble 78 is between the centering lines 95, 96, which are marked on the glass tube of the level, the pointer 25 is opposite the mark 97 at the center of the bubble if the surface on which the automobile is standing is horizontal. However, if the surface is inclined to the horizontal, the pointer 25 will not be opposite the mark 97 at the center of the bubble when the bubble is centered between the lines 95, 96. The operator is able to correct for this condition by loosening the knob 87 and shifting the scale 26 until the zero point is opposite the pointer 25. He then locks the scale in this corrected position by screwing the knob 87.

After this preliminary adjustment the operator places the instrument in front of one of the headlights, holding it by the handles 12, 14, and presses the contact 16 against the center of the lens. Maintaining sufficient pressure on the rubber contact 16 to prevent the contact from slipping on the lens, he manipulates the instrument, employing the flexible contact 16 as a universal pivot, until he finds the position of the instrument at which a maximum reading is obtained on the meter scale 21. When the meter indicates that the instrument axis has thus been brought into line with the headlight beam, the operator holds the instrument stationary and turns the knob 23 with his thumb, so as to return the bubble 78 to its central position between the centering lines 95, 96. After this has been done the position of the pointer 25 on the scale 26 is read, and this reading is an indication of the vertical inclination of the beam to the line of travel of the automobile.

Figure 2:
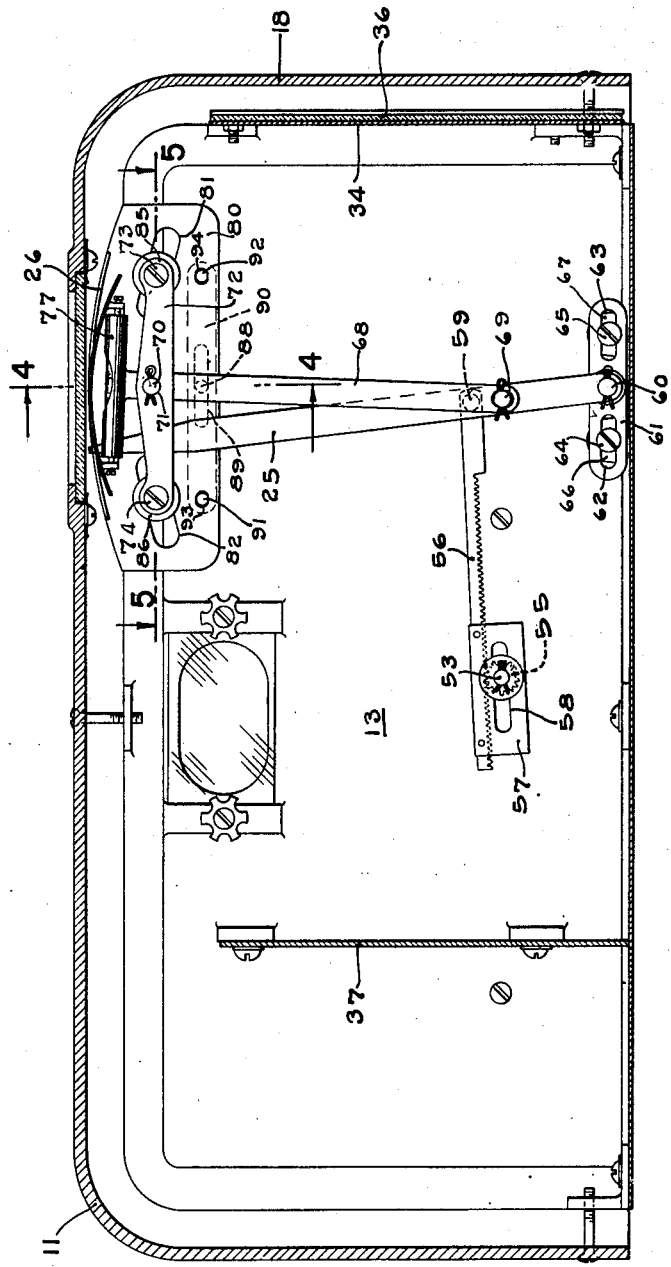
Fig. 2 is a vertical longitudinal section taken along line 2—2 of Fig. 1.

As previously mentioned, the adjustment of the pointer 25 (Fig. 1) is facilitated by the fact that the pointer moves in the same direction as the bubble 78 so that, for example, when the instrument has been positioned to obtain the maximum reading on the meter 19, if the bubble 78 is rearward of the centering line 96, the operator turns the knob 23 to move the pointer 25 forwardly, and in so doing moves the bubble forwardly. As can be seen in Fig. 2, when the pointer 25 is rocked forwardly, that is, to the right in this view, the lever 68 is turned counterclockwise on its pivot 70, thus causing the bubble 78 to move to the right or forwardly in the same direction as the pointer 25. Due to this linkage construction, there is only one position of the pointer 25 and lever 68 in which the pointer is opposite the bubble 78. This is the true horizontal position, that is, when the axis of the instrument is horizontal. The pointer is adjusted to this position at the factory by loosening the screws 64, 65 and sliding the bar 61 forwardly or rearwardly when the instrument is placed on a surface which is known to be horizontal.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A leveling mechanism for a headlight testing instrument having a reference axis adapted to be aligned with the beam of light projected from a headlight, comprising a scale on said instrument, a pointer pivotally mounted on said instrument for movement over the scale, a spirit level pivotally mounted on said instrument between said scale and the pivotal mounting of said pointer, means pivotally connecting said pointer with said level between their respective pivots, and means for operating said pointer to position the level for centering the bubble thereof horizontally in the level whereby the pointer indicates on the scale the inclination of the headlight beam above or below the horizontal.

2. Leveling mechanism for an instrument having a reference axis adapted to be aligned with the beam projected by a headlight, comprising a scale on said instrument, a pointer arm pivoted on said instrument for movement over said scale, a lever connected by a pin and slot arrangement to said pointer intermediate the pivot thereof and said scale, a fulcrum for said lever, a spirit level mounted on said lever for movement simultaneously with said pointer, and manually operable means for operating said lever to center the bubble of said level when the reference axis of said instrument is inclined to the horizontal and to position the pointer to indicate on the scale the elevation of the headlight beam above or below the horizontal.

3. A leveling mechanism for a headlight testing instrument having a reference axis adapted to be aligned with the beam projected from a headlight so as to determine the vertical inclination of the beam projected by the headlight, comprising a scale having a zero indicating mark, an arm pivotally mounted on said instrument and having a pointer movable over the scale, a spirit level disposed adjacent said scale and pivotally mounted adjacent the same for movement relative to the zero mark thereof, and motion-transmitting means interconnecting said arm and said level for opposite rotation on their respective pivots, and means for moving said arm in one direction whereby said pointer will move in the same direction as the bubble of said level to indicate the horizontal position of said level with respect to the zero indicating mark on the scale.

4. Leveling mechanism for a headlight testing instrument having a reference axis adapted to be positioned in alignment with the headlight beam to determine the vertical inclination of the beam projected by the headlight, comprising a scale mounted on the instrument and having a zero indicating mark, means for adjusting the scale to dispose its zero indicating mark at a predetermined position, a pointer pivotally mounted on said instrument for movement over the scale, a lever pivotally mounted on said instrument between the scale and the pivot of said pointer, a spirit level disposed on said lever adjacent said scale, and motion-transmitting means interconnecting said pointer and said lever between the pivotal mountings thereof for opposite rotation on their respective pivots, whereby said pointer will move in the same direction as the bubble of said level to facilitate adjusting said level to horizontal position.

5. Leveling mechanism for an instrument having a reference axis adapted to be aligned with the beam projected by a headlight, comprising a scale mounted on the instrument, a pointer pivoted for movement over the scale, a lever connected to said pointer intermediate the pivot thereof and said scale, a fulcrum for said lever located between the scale and the connection of said lever with said pointer, a spirit level mounted on said lever and movable therewith when said pointer is moved, a rack bar for operating said pointer, a pinion for operating said rack bar, and manually operable means for actuating the pinion whereby to center the bubble of said level relative to horizontal when the reference axis of said instrument is inclined with respect to horizontal and to simultaneously position the pointer to indicate on the scale the elevation of the headlight beam above or below horizontal.

6. An automobile headlight testing instrument comprising a case adapted to be placed in a predetermined position with respect to a headlight beam, a scale within the case and visible from the exterior thereof, a pointer pivotally mounted within said case for movement over said scale to indicate the vertical inclination of the case to the horizontal, a spirit level within said case adjacent said scale, a lever carrying said level at one end and having its opposite end connected to said pointer for pivotal sliding movement relative thereto, a fulcrum for said lever mounted in the case adjacent said level, and means connected to said pointer for imparting opposite movements to said pointer and said level on their respective pivot and fulcrum whereby to move said pointer in the same direction as the bubble of said level upon adjustment of said level with respect to horizontal position.

7. A leveling mechanism for a headlight testing instrument having a reference axis adapted to be aligned with the light beam projected by a headlight to be tested, comprising a scale on said instrument, a pointer pivoted on said instrument for movement over said scale, a lever having a slotted end pivotally connected to said pointer adjacent the pivot thereof, a fulcrum for said lever adjacent said scale, a spirit level mounted on said lever aside of said scale, and manually operable means for actuating said pointer relative to said scale and moving the level until the bubble thereof assumes horizontal.

8. In a device for determining the vertical inclination of the beam of light projected from a headlight, a leveling mechanism comprising means for orienting said device with respect to said light beam, a scale on said device, a pointer pivoted on said device for movement over said scale, a lever connected by pin and slot connection to said pointer intermediate the pivot thereof and said scale, a spirit level mounted on said lever adjacent said scale, a fulcrum for said lever between said pin and slot connection and said spirit level, and means for actuating said pointer to position the pointer relative to said scale and simultaneously rock said level until the bubble thereof is set at horizontal and said pointer indicates on said scale the angle of inclination of the headlight beam with respect to horizontal.

9. A leveling mechanism for a headlight tester having a reference axis adapted to be aligned with a light beam projected from a headlight to be tested, comprising a scale mounted on said headlight tester, an arm pivotally mounted on said tester and having a pointed end movable contiguous to said scale, a lever pivotally mounted on said tester between said scale and the pivotal mounting of said arm, a spirit level carried by said lever adjacent said scale for movement relative thereto, means for interconnecting said lever and arm intermediate the respective pivotal mountings thereof, and manually controlled means for rotating said lever and arm inversely with respect to each other.

10. A leveling mechanism for a headlight testing instrument having a reference axis, said leveling mechanism comprising a scale on said instrument, a pointer arm pivotally mounted remote from said scale and having a pointer movable over the scale, a spirit level pivotally mounted on the instrument adjacent said scale, and motion-transmitting means interconnecting said pointer arm and said level between their respective pivots for effecting opposite rotation of said arm and level about their respective pivots to thereby move said pointer in the same direction as the bubble of said level to facilitate adjusting said level to horizontal position when the instrument is positioned in the headlight beam with its reference axis aligned with the beam.

HERBERT GLENN HOLMES.

REFERENCES CITED

The following references are of record in the file of this patent:

UNITED STATES PATENTS

| Number | Name | Date |
|---|---|---|
| 775,483 | Whitehouse | Nov. 22, 1904 |
| 2,003,797 | Arbuckle | June 4, 1935 |
| 2,106,652 | Pinson | Jan. 25, 1938 |
| 2,215,224 | MacMillan | Sept. 17, 1940 |
| 2,234,436 | King | Mar. 11, 1941 |
| 2,284,795 | Belaef | June 2, 1942 |
| 2,358,010 | Holmes | Sept. 12, 1944 |
| 2,411,879 | Holmes | Dec. 3, 1946 |